United States Patent [19]
dos Santos

[11] Patent Number: 5,476,898
[45] Date of Patent: Dec. 19, 1995

[54] COPOLYMER SOLUTIONS BASED ON ADDITION PRODUCTS OF α, β-UNSATURATED CARBOXYLIC ACID WITH GLYCIDYL ESTERS AND COPOLYMERISABLE α, β-UNSATURATED MONOMERS

[75] Inventor: Antonio M. dos Santos, Buxtehude, Germany

[73] Assignee: Synthopol Chemie Dr. Rer. Pol. Koch GmbH & Co., KG, Buxtehude, Germany

[21] Appl. No.: 432,855

[22] Filed: May 2, 1995

Related U.S. Application Data

[60] Division of Ser. No. 912,857, Jul. 14, 1992, which is a continuation-in-part of Ser. No. 642,962, Jan. 18, 1991, Pat. No. 5,153,257.

[30] Foreign Application Priority Data

Jul. 20, 1991 [DE] Germany .......................... 41 24 167.3

[51] Int. Cl.⁶ .......................... C08L 37/00; C08L 33/10; C08L 83/06
[52] U.S. Cl. .......................... 524/548; 524/561; 524/588
[58] Field of Search .......................... 524/548, 561, 524/588

[56] References Cited

U.S. PATENT DOCUMENTS 5,180,773  1/1993  Dalibor .................................. 524/853

Primary Examiner—Joseph L. Schofer
Assistant Examiner—Wu C. Cheng
Attorney, Agent, or Firm—Beveridge, DeGrandi, Weilacher & Young

[57] ABSTRACT

Copolymer solutions, based on addition products of α, β-unsaturated carboxylic acid with glycidyl esters and copolymerisable α, β-unsaturated monomers, with a remarkably high as-copolymerized solids content of about 80% by weight and which can be processed with polyisocyanates into high solids two-component coatings having a good processing viscosity. The copolymers contain a methoxyfunctional polysiloxane as copolymerized units. The copolymers can be processed with amino resins into binders for baking finishes which used as improved clear coatings for automotive topcoating produce paint films which possess excellent abrasion resistance in car washes.

5 Claims, No Drawings

COPOLYMER SOLUTIONS BASED ON ADDITION PRODUCTS OF α, β -UNSATURATED CARBOXYLIC ACID WITH GLYCIDYL ESTERS AND COPOLYMERISABLE α, β -UNSATURATED MONOMERS

REFERENCE TO A RELATED APPLICATION

This is a divisional of application Ser. No. 07/912,857 filed on Jul. 14, 1992 which is a continuation in part of Ser. No. 07/642,962 filed on 01/18/91, now U.S. Pat. No. 5,153,257.

BACKGROUND OF THE INVENTION

The present invention relates to copolymer solutions based on addition products of α, β-unsaturated carboxylic acid with glycidyl esters and copolymerisable α, β-unsaturated monomers with and without hydroxyl groups. The present invention also relates to the preparation of such hydroxyl-containing copolymers and to the use thereof in clear or pigmented coatings.

Hydroxyl-containing copolymers based on (meth)acrylates and reaction products of acrylic acid and glycidyl esters of α-alkylalkanemonocarboxylic acids and/or α,α-dialkylalkanemonocarboxylic acids which can be processed together with organic polyisocyanates to form coatings are known. DE-B-1 668 510 describes copolymers of addition products of α,β-ethylenically unsaturated carboxylic acids with glycidyl esters and copolymerisable α,β-unsaturated monomers with and without hydroxyl groups. DE-C-2 603 259 discloses two-component coatings containing specific binders. These binders are copolymers based on styrene, methyl methacrylate, acrylic acid and glycidyl esters of α-alkylalkanemonocarboxylic acids and/or α,α-dialkylalkanemonocarboxylic acids obtained by heating with simultaneous esterification and polymerization in inert solvents in the presence of polymerization initiators with or without chain terminators.

The solids contents of prior art copolymer solutions on termination of the simultaneous esterification and copolymerization is not more than 55% by weight or, according to page 4 of DE-A-3 740 774 (component A), about 65% by weight, although the objective of the latter reference was a particularly high solids content.

SUMMARY OF THE INVENTION

Objects of the present invention include, but are not limited to, the following:

1. To provide copolymer solutions which have a significantly higher solids content.
2. To provide processes for preparing the novel copolymer solutions.
3. The binders obtainable from the novel copolymer solutions shall, when used with difunctional and/or higher polyisocyanates, have an increased solids content for the same viscosity. This means that the two-component coatings viscosity. This means that the two-component coatings prepared from the copolymer solutions or the binder of the invention can be applied quickly, for example by omitting one or more spraying operations. Furthermore, because of the higher solids content of the ready-prepared two-component coatings, less organic solvent shall be emitted into the environment.
4. The copolymer solutions or binders, when combined with aliphatic polyisocyanates, shall produce air and oven-drying high-solids two-component finishes having high mechanical, chemical, weathering and ultra-violet radiation resistance.
5. The provision of copolymer solutions or binders or clear or pigmented coatings with an increased solids content that lead to coatings of high gloss, good build, good flow, less environmental pollution and improved processing reliability.
6. The copolymer solutions or binders shall be processable into two-component coatings highly suitable for use not only as automotive original equipment coatings but also as automotive refinish coatings.
7. The binders mentioned earlier under point 3 shall result in improved clear coatings for automotive topcoating by producing paint films with excellent abrasion resistance in car washes.
8. The novel polymer solutions shall also be combinable with amino resins to form binders which are processed to form baking finishes with or without pigments. It shall also be possible to add polyisocyanates to the copolymer-amino resin combination. Again, the foregoing binders are suitable for improved clear baking finishes for automotive topcoating which provide paint films with excellent abrasion resistance in car washes.

DETAILED DESCRIPTION OF THE INVENTION

It has been found that these and other objects are achieved by providing a copolymer solution which contains a hydroxyl-containing copolymer based on addition products of α, β-unsaturated carboxylic acid with glycidyl esters and copolymerisable α, β-unsaturated monomers with and without hydroxyl groups, said copolymer being characterized in that it consists essentially of a hydroxyl-containing copolymer obtainable from a) 10 to 30% by weight of glycidyl esters of a-alkylalkanemonocarboxylic acids and/or α, α-dialkylalkanemonocarboxylic acids, b) 5 to 12% by weight of methacrylic acid, c) 10 to 27% by weight of hydroxyalkyl methacrylate having 1 to 6 carbon atoms in the hydroxyalkyl radical, d) 10 to 38% by weight of styrene, e) 1 to 5% by weight of polypropylene glycol monomethacrylate having an average molecular weight of 350 to 387, f) 3 to 20% by weight of alkyl methacrylate having 1 to 8 carbon atoms in the alkyl radical, g) 9 to 20% be weight of solvent-free, reactive, methoxy-functional polysiloxane, the percentages of components a, b, c, d, e, f, and g always adding up to 100% by weight.

A preferred embodiment of the copolymer is obtainable from:

a) 17 to 25% by weight of glycidyl esters of α-alkylalkanemonocarboxylic acids and/or α,α-dialkylalkanemonocarboxylic acids, b) 7 to 12% by weight of methacrylic acid, c) 15 to 26% by weight of 2-hydroxyethyl methacrylate, d) 17 to 28% by weight of styrene, e) 1 to 3% by weight of polypropylene glycol monomethacrylate having an average molecular weight of 350 to 387, f) 5 to 15% by weight of methyl methacrylate, g) 12 to 17% by weight of solvent-free, reactive, methoxy-functional polysiloxane, the percentages of components a, b, c, d, e, f and g always adding up to 100% by weight.

Another preferred embodiment of the copolymer is obtainable from:

a) 18 to 24% by weight of glycidyl esters of α-alkylalkanemonocarboxylic acids and/or α,α-dialkylalkanemonocarboxylic acids, b) 6 to 12% by weight of methacrylic acid, c) 17 to 22% by weight of 2-hydroxymethyl methacrylate, d) 20 to 28% by weight of styrene, e) 1 to 3% by weight of polypropylene glycol monomethacrylate having an average molecular weight of 350 to 387, f) 8 to 12% be weight of methyl methacrylate, g) 12 to 17% by weight of solvent-free, reactive, methoxy-functional polysiloxane, the percentages of components a, b, c, d, e, f and g always adding up to 100% by weight.

Another preferred embodiment of the copolymer solution is obtainable from:

a) 8 to 22% by weight of glycidyl esters of α-alkylalkanemonocarboxylic acids and/or α,α-dialkylalkanemonocarboxylic acids, b) 7 to 10% by weight of methacrylic acid, c) 19 to 22% by weight of 2-hydroxyethyl methacrylate, d) 20 to 28% by weight of styrene, e) 1 to 3% by weight of polypropylene glycol monomethacrylate having an average molecular weight of 350 to 387, f) 9 to 11% by weight of methyl methacrylate, g) 13 to 17% by weight of solvent-free, reactive, methoxy-functional polysiloxane, the percentages of components a, b, c, d, e, f and g always adding up to 100% by weight.

The most preferred embodiment of the above-mentioned copolymer solutions is characterized in that, after its preparation, it consists of A) 15–25% by weight, preferably 15 to 20% by weight, of customary inert paint solvents, preferably with boiling points of 150° to 200° C., and B) 75–85% by weight, preferably 85 to 80% by weight, of hydroxyl-containing copolymers.

It has been found that such a copolymer solution, when used with difunctional and/or higher polyisocyanates unexpectedly produces, compared with the prior art, an increased solids content for the same viscosity or a reduced viscosity for the for the same solids content. What is more, it has coating advantages, such as improved gloss, build, flow, processing reliability as well as the high solids content, and also better environmental properties.

The copolymer solution of the present invention is prepared by solution polymerization. This involves an addition reaction between components a and b with a simultaneous condensation with component g by elimination of methanol, which is removed in the reflux of the boiling reaction mixture. This process comprises introducing the solvents and the glycidyl esters of α-alkylalkanemonocarboxylic acids and/or α,α-dialkylalkanemonocarboxylic acids into the reaction vessel as initial charge, heating to the boil, and continuously adding the mixture or mixtures of monomers, optionally carboxy-epoxy catalyst and initiator continuously over about 12–20 hours. On completion of the metered addition the polymerization temperature is maintained for a further 2 to 5 hours—with or without the addition of further polymerization initiator—until conversion is virtually complete. The polymerization is carried out at temperatures between 140° and 195° C., preferably at 160° to 190° C., the reaction being initiated at about 180° to 190° C. The temperature decreases in the course of the simultaneous copolymerization, addition and condensation.

In a preferred embodiment, illustrated by the Examples, a mixture of inert solvents is introduced as initial charge and heated to the boil under reflux, the inert solvents having been selected in such a way that the reflux temperature is about 188° C. Following initiation of the copolymerization and towards the end of the metered addition time, the boiling temperature of the copolymer solution decreases to about 170° to about 140° C. The metered addition is then followed by holding the temperature at 170° C. to about 140° C. until conversion is virtually complete and the desired solids content (about 80% in the Examples) has been obtained.

The polymerization reaction is initiated with known polymerization initiators. Suitable initiators are for example peroxides which decompose thermally into free radicals by a first order reaction. Initiator type and amount are chosen in such a way that a very constant supply of free radicals is present at the polymerization temperature during the metered addition phase.

Preferred initiators for the polymerization are: dialkyl peroxides, such as di-tert-butyl peroxide, dicumyl peroxide; hydroperoxides, such as cumene hydroperoxide, tert-butyl hydroperoxide; and peresters, such as tert-butyl perbenzoate, tert-butyl per-3,5,5-trimethylhexanoate, tert-butyl per-2-ethylhexanoate.

The polymerization initiators, in particular tert-butyl per-2-ethylhexanoate, are preferably added in an amount of 2 to 6% by weight, based on the weight of monomer used.

The molecular weight of which may be regulated using chain transfer agents. Examples are mercaptans, thioglycolic esters and chlorohydrocarbons, preference being given to dodecylmercaptan.

Suitable solvents for the solution polymerization are customary inert paint solvents alone, preferably mixed, with boiling points of 150° C. to 200° C., preferably 154° C. to 200° C. The preferred organic solvents are those which later are also used in the ready-prepared coatings. Examples of such solvents are: glycol ethers, such as ethylene glycol dimethyl ether; glycol ether esters, such as ethylglycol acetate, butylglycol acetate, 3-methoxy-n-butyl acetate, butyldiglycol acetate, methoxypropyl acetate; ethoxypropyl acetate, esters, such as butyl acetate, isobutyl acetate, amyl acetate; and ketones, such as methyl ethyl ketone, methyl isobutyl ketone, diisobutyl ketone, cyclohexanone, isophorone, aromatic hydrocarbons, such as xylene. Shellsol A (registered trademark for aromatic hydrocarbon mixtures) and aliphatic hydrocarbons can likewise be used cut with the above mentioned solvents. Preference is given to using a mixture of butyl glycol acetate, Shellsol A and ethoxypropyl acetate in a weight ratio of 1:2:2.

Component a) for preparing the hydroxyl containing copolymer solutions of the invention comprises glycidyl esters of α-alkylalkanemonocarboxylic acids and/or α,α-dialkylalkanemonocarboxylic acids. The glycidyl esters preferably have the empirical formula $C_{13}H_{24}O_3$ individually or together.

Since the glycidyl radical in the glycidyl ester of such α-alkylalkanemonocarboxylic acids and/or α,α-dialkylalkanemonocarboxylic acids has the empirical formula $C_3H_5O$, the α-alkylalkanemonocarboxylic acids and α,α-dialkylalkanemonocarboxylic acids are isomer mixtures of those monocarboxylic acids which contains a $C_{10}$ chain. These acids are preferably very highly substituted at the α-disposed carbon atom and fully saturated; examples thereof are described in Deutsch Farbenzeitschrift, No. 10/volume 16, page 435 (incorporated by reference).

Suitable hydroxyalkyl methacrylates having 1 to 6 carbon atoms in the hydroxyalkyl radical are hydroxymethyl methacrylate, 2-hydroxyethyl methacrylate, 2-hydroxypropyl methacrylate, 4-butanediol monomethacrylate, 5-pentanediol monomethacrylate, cyclohexanediol monomethacrylate and 4-dihydroxymethylcyclohexane monomethacrylate, alone or mixed, preference being given to using 2-hydroxyethyl methacrylate.

The solvent-free, reactive, methoxy-functional polysiloxane component g with a narrow molecular weight distribution, a low average molecular weight and a very low proportion of volatiles in Silicone Intermediate SY 231 from Wacker-Chemie GmbH, 8000 Munich 22, Germany.

Suitable carboxy-epoxy catalysts based on an alkali metal compound are all sodium, lithium, potassium, rubidium and caesium compounds- alone or mixed- which are soluble in the reaction mixture of methacrylic acid, monoglycidyl compound and vinyl compounds or at least dissolve therein in the course of the metered addition and/or in the course of the reaction batch being maintained at the reaction temperature for the purpose of esterification by addition with simultaneous copolymerization, although the alkali metal compound used should be free of constituents which may have an unfavorable effect in the course of copolymerization of the addition product, which is an ester.

It is possible to use for example the carbonates, bicarbonates, formates, iodides, bromides, fluorides and hydroxides of the aforementioned alkali metals. On a factory scale it is best to use lithium hydroxide and potassium hydroxide, alone or mixed. Of these, potassium hydroxide is particularly advantageous on a factory scale on account of its low cost and excellent catalytic properties. The alkali metal compound or hydroxide or mixture is advantageously dissolved in the methacrylic acid to be esterified. However, it is also possible first to convert the alkali metal compound, e.g. alkali metal hydroxide, carbonate or bicarbonate, and the methacrylic acid into the alkali metal salt thereof and then to dissolve the alkali metal salt of methacrylic acid as catalyst in the reaction mixture, if necessary by heating in the course of the addition reaction.

It is in general sufficient to add from about 0.001% by weight to about 0.5% by weight of alkali metal compound of the aforementioned kind, based on the weight of the ester-forming components, for the addition reaction. However, preference is given to an addition of about 0.001% by weight to about 0.3% by weight of alkali metal compound. The most preferred addition range extends from about 0.005% by weight to 0.1% by weight of an alkali metal compound, in which case the alkali metal compound used are very particularly advantageously potassium and lithium compounds.

Special studies have shown that, if an alkali metal carboxy-epoxy catalyst, preferably an alkali metal hydroxide carbonate or bicarbonate, is used in preparing the copolymer solution, the coating compositions obtainable therefrom with polyisocyanates have special, unforeseeable properties. For instance, such two-component coating compositions have a longer pot life and the coatings produced therefrom have a better aging resistance as regards the loss in elasticity.

The copolymer solutions according to the invention can be processed into clear or pigmented coating compositions. For this they are admixed in solvents with a customary coatings polyisocyanate in the presence or absence of customary coatings additives and auxiliaries. Preferably, 60 to 80% by weight of the hydroxyl containing copolymer B is admixed with 20 to 40% by weight of a difunctional and/or higher polyisocyanate as component C; the percentages of components B and C always add up to 100%.

The polyisocyanates C usable for crosslinking the copolymer B according to the invention are typical coatings polyisocyanates.

The proportion of polyisocyanate crosslinker is chosen in such a way that from 0.5 to 1.5 isocyanate groups are added per hydroxyl group of the binder mixture. Excess isocyanate groups can react with moisture and contribute to the crosslinking.

It is possible to use aliphatic, cycloaliphatic and aromatic polyisocyanates such as hexamethylene diisocyanate, trimethylhexamethylene diisocyanate, isophorone diisocyanate, 4,4'-diisocyanatodicyclohexylmethane, toluylene 2,4-diisocyanate, o-, m- and p-xylylene diisocyanate, 4,4'-diisocyanatodiphenylmethane; blocked polyisocyanates, such as polyisocyanates blocked with acidic CH, NH or OH compounds; and also, for example, polyisocyanates with biuret, allophanate, urethane or isocyanurate groups. Examples of such polyisocyanates are a biuret formed from 3 mol of hexamethylene diisocyanate with 1 mol of water and having an NCO content of about 22% (corresponding to the commercial product Desmodur N, BAYER AG, registered trademark); a polyisocyanate with isocyanate groups, prepared by trimerisation of 3 mol of hexamethylene diisocyanate and having an NCO content of about 21.5% (corresponding to the commercial product Desmodur N 3390, BAYER AG, registered trademark) or polyisocyanates with urethane groups, which are reaction products of 3 mol of toluylene diisocyanate and 1 mol of trimethylolpropane and have an NCO content of about 17.5% (corresponding to the commercial product Desmodur L, BAYER AG, registered trademark).

Preference is given to using Desmodur N and Desmodur N 3390, BAYER AG, registered trademark.

As mentioned earlier, coating compositions prepared from components B and C can be transparent or pigmented. Transparent coating compositions find use for example as clear coatings in a two-layer coating composed of a pigment-containing basecoat and a transparent topcoat, applied wet-on-wet and subsequently cured either in air or in baking stoves. These clear coating compositions may, in addition to customary solvents for controlling the spray viscosity, also contain customary flow control agents and light stabilizers but also other customary coatings additives.

The aforementioned transparent or pigmented coating compositions may contain as further hardeners from 1 to 10% by weight of reactive amino resins customary for coatings.

To prepare pigmented coating compositions, the individual constituents are mixed with one another and conventionally homogenized or ground. A possible procedure is for example first to mix some of the copolymer solution with the pigments to be included and customary coatings auxiliaries and solvents and then to subject the mixture to milling.

The mill base is then completed with the remaining copolymer solution.

The coating compositions obtained from the hydroxyl-containing copolymer solution according to the invention have the considerable advantage of a high solids content coupled with a relatively low viscosity. Their flow-out properties are excellent and they lead to paint films of excellent gloss and outstanding build. The paint films obtained are very rapidly assemblyproof and adhesive to adhesive tape, permitting for example multiple coating. The coating compositions obtainable from the copolymer solutions according to the invention are thus particularly suitable for use in the automotive industry for coating motor car bodies, but also suitable in the refinishing sector for the rapid repair of, for example, accident damage.

The copolymer solutions of the invention can be combined with amino resins to form binders which are suitable for baking finishes. Suitable amino resins are the known reaction products of aldehydes, in particular formaldehyde, with substances carrying a plurality of amino or amido groups, for example melamine, urea, N,N'-ethyleneurea, dicyandiamide or benzoguanamine, obtained by etherification with alcohols, in particular with n-butanol or isobutanol, in particular melamine-formaldehyde condensates, for example a melamine-formaldehyde condensate which has been etherified with isobutanol in an average molar ratio of 1 melamine-6-formaldehyde to 3 mol of isobutanol. For instance, a baking clearcoat finish can consist of 50 to 60% by weight of customary coatings solvents, of 25 to 44% by weight of copolymers of the invention, 19 to 4% by weight of an amino resin, as well as customary baking finish additives.

Embodiments of the invention will now be more particularly described by way of example.

EXAMPLES

Preparation of Copolymer Solution

A four liter three-necked flask equipped with a stirrer, a contact thermometer, a spherical condenser with a reflux trap for methanol and any other elimination products, and 2 dropping funnels is charged with constituent I in accordance with the quantitative data given below in the table and the contents are heated with stirring and under switched-on reflux cooling to about 180° to 190° C. Constituent II (monomer mixture and KOH as carboxy-epoxy catalyst and optionally a chain transfer agent) and Constituent III (solvent-initiator mixture) are metered in continuously from dropping funnels 1 and 2 in the course of 16 hours. The temperature decreases from 188° C. towards the end of the addition time to about 160° to about 165° C. On completion of the metered addition a temperature of about 160° to 167° C. is maintained for 3 hours, during which if necessary further polymerization initiator is added after one hour, so that conversion is virtually complete.

TABLE (weights in grams)

| Constituent | | Copolymer 1 | Copolymer 2 | Copolymer 3 |
|---|---|---|---|---|
| I | Butylglycol acetate | 100 | 100 | 100 |
| | Ethoxypropyl acetate | 160 | 160 | 160 |
| | Mixture of aromatic hydrocarbons (Shellsol A, registered trademark | 200 | 200 | 200 |
| | Glycidyl ester (Cardura E 10, registered trademark) | 400 | 400 | 400 |
| II | Methacrylic acid | 182 | 182 | 182 |
| | 2-Hydroxyethyl methacrylate | 420 | 478 | 536 |
| | Styrene | 478 | 360 | 247 |
| | Polypropylene glycol monomethacrylate* | 20 | 20 | 21 |
| | Methyl methacrylate | 200 | 160 | 114 |
| | Potassium hydroxide | 0.1 | 0.1 | 0.1 |
| | Silicone Intermediate SY 231 | 300 | 400 | 500 |
| III | Ethoxypropyl acetate | 40 | 40 | 40 |
| | tert-Butyl per-2-ethylhexanoate | 80 | 80 | 80 |
| | Parameters: | | | |
| | Solids content (%): | 80 | 80 | 80 |
| | Viscosity*) DIN 4 cup after dilution with butyl acetate to 60% by weight solids | 60–90 sec. | 81–86 sec. | 70–100 sec. |
| | Acid number*) (based on resin solids) | 16.4–19.3 | 18.9–20 | 20..6 |
| | OH number*) (Based on resin solids): | 125–170 | 156 | 150 |

*Average molecular weight from 350 to 387
*)Range of variation obtained in numerous repeats of the reaction.

First studies have shown that the copolymer solution can be prepared under the stated conditions even in the absence of carboxy-epoxy catalysts.

Preparation of Clear Coating from Copolymer Solution 1

In a clean, dry vessel 800 g of butyl acetate, 850 g of xylene, 1050 g of a mixture of aromatic hydrocarbons (Shellsol A trademark), 150 g of light stabilizer (tradename Tinuvin® 1130), 100 g of light stabilizer (tradename Tinuvin® 292), 50 g of % strength dibutyltin dilaurate solution in xylene as accelerator and 200 g of flow-control agent (trade name Byk® 300 10% strength in xylene) are thoroughly mixed. Then 6800 g of copolymer solution 1 (previously adjusted from 80% by weight solids to 75% by weight solids with butyl acetate) are added and thoroughly mixed in. Then 3000 g of the coatings polyisocyanate Desmodur® N 3390, 80% solution in 1:1 xylene/butyl acetate, are added to the batch and thoroughly mixed in, and the viscosity of the mixture is immediately determined in a DIN 4 cup. The batch is diluted with 1:1 Shellsol® A/butyl acetate to a spray application viscosity corresponding to an efflux time of 21 seconds.

The solids content of the aforementioned clear coating is 54.8% by weight. This represents a distinct improvement over the prior art solids content of only 50.2% by weight. Further tests of the clear coating have shown that it has improved performance characteristics. Applied to test panels and, after flash-off, heated at 80° C. for 45 minutes, it produced a pendulum hardness of 120 seconds and heated at 130° C. for 30 minutes after flash-off it produced a pendulum hardness of 157 seconds. The measurement was carried out after standing for one hour for the purpose of cooling.

Preparation of a White Coating from Copolymer Solution 1

In a clean, dry vessel 550 g of Shellsol® A, 665 g of butyl acetate 98/100, 200 g of antisettling agent consisting of Bentone® 38.10% strength in xylene and 4% Anti-Terra® U, 50 g of dibutyltin dilaurate 1% strength by weight in xylene, 2500 g of copolymer solution 1 (diluted as indicated earlier to a solids content of 75% by weight) and 375 g of wetting agent (trade name Byk® 160 30% strength) are thoroughly mixed, and 2900 g of the white pigment titanium dioxide 2160 are gradually added with stirring and the mixture is then bead milled for 30 minutes with a bead ratio of 1:1. The batch are then admixed with 1500 g of copolymer solution 1, previously adjusted to 75% by weight solids, 200 g of low control agent (Byk® 344 10% strength by weight in xylene), 300 g of deaerating agent (Byketol® OK) and 760 g of n-butyl acetate and thoroughly mixed. To this batch are added 1800 g of dilution Bd 1316 as solvent followed with thorough stirring by 1800 g of the coatings polyisocyanate Desmodur®N 3390 90% strength. The solids content of the aforementioned white coating is 63% by weight. This fact reveals that the coatings which contain the copolymer solution according to the invention can be applied within a shorter period (e.g. omission of spraying operations) and that the paint film produced nonetheless has satisfactory performance characteristics and, by virtue of the spraying being shortened, less organic solvent is emitted into the environment. The aforementioned dilution Bd 1316 is obtained by mixing 2500 g of ethoxypropyl acetate, 2500 g of n-butyl acetate, 500 g of butoxyl (=3-methoxy-1-butyl acetate), 2500 g of xylene and 2000 g of Shellsol®A.

The pot life of the aforementioned white coating, measured as the DIN 4 cup efflux time, was:

| | |
|---|---|
| measured immediately following preparation | 21 seconds |
| after 2 hours | 27 seconds |
| after 4 hours | 39 seconds |
| after 6 hours | 58 seconds |
| after 8 hours | 120 seconds |

Steel panels coated with commercial primer were overcoated after one day with the aforementioned white coating and cured at 80° C. for 60 minutes. The properties were measured after 24 hours:

| | | |
|---|---|---|
| primer | 24 μm | |
| coating | 44 μm | |
| gloss ∠ 60° | 93% | measured to DIN 67530 and ISO 2813 |
| Koenig pendulum hardness | 108" | measured to DIN 53157 or ISO 1522 |
| Buchholz hardness | 87 | measured to DIN 53153 or ISO 2815 |
| Erichsen indentation | 7.5 mm | measured to DIN 53156 or ISO 1520 |
| adhesion (cross hatch test) | Gt 0 | measured to DIN 53151 or ISO 2409 |
| resistance test | | |
| 5' xylene | pass | |
| 5' four-star petrol unleaded | pass | |

Resistance Tests with Xylene and Unleaded Four-star Petrol

A cotton wool swab soaked with xylene or unleaded four-star petrol was placed on the baked film of the white coating in the covered state and left for 5 minutes. After the cotton wool swab had been removed and the test liquid wiped away, the dry tested film was assessed. For a film to pass, as in the present case, it must not show any changes.

Evaluation of Aforementioned Test Results

Despite the high solids content of the in-test coating, the measured values show that the gloss, the Koenig pendulum hardness, the Buchholz hardness, the Erichsen indentation, the cross hatch and the petrol resistance tests all produced values which correspond to those of very good commercial products, which however, have the disadvantage that the coatings have only a lower solids content. Any person skilled in the art knows that as the solids content of a coating increases it is very difficult to achieve the required high quality features at all, so that the test results demonstrate surprising properties.

Preparation of a Clear Coating from Copolymer Solution 2

In a clean, dry vessel 800 g of n-butyl acetate, 850 g of xylene, 1050 g of a mixture of aromatic hydrocarbons (Shellsol A trademark), 150 g of light stabilizer (trade name Tinuvin® 1130), 100 g of light stabilizer (trade name Tinuvin® 292), 50 g of a 5% strength dibutyltin dilaurate solution in xylene as accelerator and 200 g of flow control agent (trade name Byk® 300 10% strength in xylene) are thoroughly mixed. Then 6800 g of copolymer solution 2 (previously adjusted from 80% by weight solids to 75% by weight solids with butyl acetate) are added and thoroughly mixed in. Then 3000 g of coatings polyisocyanate/Desmodur® N 3390 dissolved in 80% strength in 1:1 xylene/butyl acetate are added to the batch and thoroughly mixed in and the viscosity is determined at once in a DIN 4 cup. By diluting with a 1:1 Shellsol® A/butyl acetate mixture the batch is adjusted to a spray application viscosity corresponding to an efflux time of 21 seconds.

The solids content of the aforementioned clear coating is 54.7% by weight. This represents a distinct improvement over the prior art solids content of only 50.2% by weight. Further tests on the clear coating have shown that it has improved performance characteristics.

Preparation of White Coating from Copolymer Solution 2

In a clean, dry vessel 550 g of Shellsol® A, 665 g of n-butyl acetate, 200 g of an antisettling agent comprising Bentone® 38 10% strength in xylene and 4% of Anti Terra® U, 50 g of dibutyltin dilaurate 1% strength by weight in xylene, 2500 g of copolymer solution 2 (diluted to a solids content of 75% by weight as indicated above) and 375 g of a wetting agent (trade name Byk® 160 30% strength) are thoroughly mixed, and 2900 g of the white pigment titanium dioxide 2160 are gradually added with stirring, and the mixture is introduced into a bead mill and bead milled for 30 minutes with a bead ratio of 1:1. The batch is then admixed with 1500 g of copolymer solution 2 (adjusted to 75% solids), 200 g of a flow control agent (Byk® 344 10% strength by weight in xylene), 300 g of a deaerating agent (Byketol® OK) and 760 g of butyl acetate and thoroughly mixed. To this batch are added 1800 g of dilution Bd 1316 as solvent followed with thorough stirring by 1800 g of coating polyisocyanate Desmodur® N 3390 90% strength. The solids content of the aforementioned white coating is 63.5% by weight. This fact shows that coatings which contain the copolymer solution of the invention can be applied within a shorter time (for example through omission of spraying operations) and that the pain film produced nonetheless has satisfactory performance characteristics and less organic solvent is emitted into the environment by virtue of the shortening of the spraying operation.

The pot life of the aforementioned white coating, measure as efflux time from the DIN 4 cup, was:

| measured immediately following preparation | 21 seconds |
|---|---|
| after 2 hours | 33 seconds |
| after 4 hours | 54 seconds |
| after 6 hours | 120 seconds |

Steel panels coated with commercial primer were overcoated after one day with the aforementioned white coating and cured at 80° C. for 60 minutes. The properties were measured after 24 hours:

| primer | 22–26 μm |
|---|---|
| coating | 44–51 μm |
| gloss ≮ 60° | 93% measured to DIN 67530 and ISO 2813 |
| Koenig pendulum hardness | 114" measured to DIN 53157 or ISO 1522 |
| Buchholz hardness | 87 measured to DIN 53153 or ISO 2815 |
| Erichsen indentation | 6.8 mm measured to DIN 53156 or ISO 1520 |
| adhesion (cross hatch test) | Gt 0 measured to DIN 53151 or ISO 2409 |
| resistance test | |
| 5' xylene | pass |
| 5' four-star petrol unleaded | pass |

The aforementioned test results likewise show the surprising properties of the films compared from the white coating based on copolymer solution 2, as demonstrated earlier at length with the films of white coating based on copolymer solution 1.

Preparation of an Amino Resin Clear Coating from Copolymer Solution 1

In a clean, dry vessel 400 g of aromatic hydrocarbons (Shellsol A trademark), 35 g of light stabilizer (trade name Tinuvin® 1130), 35 g of light stabilizer (trade name Tinuvin® R 292) and 200 g of a flow control agent (trade name Byk® 300 10% strength in xylene) are thoroughly mixed. Then 5600 g of copolymer solution 1 (previously adjusted from 80% by weight solids to 75% by weight solids with butyl acetate) are added and thoroughly mixed in. Then 373 g of melamine resin BE 683 are added to the batch and thoroughly mixed in and the viscosity is determined at once in a DIN 4 cup. By diluting with a mixture of 30 g xylene, 20 g of n-butanol and 35 g of Solvesso® 150 and 5 g of ethoxypropyl acetate the batch is adjusted to a spray application viscosity corresponding to an efflux time of 21 seconds.

The solids content of the aforementioned clear coating is 43.6% by weight. This represents a distinct improvement over the prior art solids content of only 40% by weight. Further tests on the clear coating have shown that it has improved performance characteristics. Applied to test panels and, after drying, baked at 130° C. for 30 minutes, the clear coating resulted in a pendulum hardness of 128 seconds.

Preparation of an Amino Resin Clear Coating from Copolymer Solution 1

In a-clean, dry vessel 400 g of aromatic hydrocarbons (Shellsol A trade mark), 35 g of light stabilizer (trade name Tinuvin® 1130), 35 g of light stabilizer (trade name Tinuvin® R 292) and 200 g of a flow control agent (trade name Byk® 300 10% strength in xylene) are thoroughly mixed. Then 6530 g of copolymer solution 1 (previously adjusted from 80% by weight solids to 75% by weight solids with butyl acetate) are added and thoroughly mixed in. Then 280 g of melamine resin BE 683 are added to the batch and thoroughly mixed in and the viscosity is determined at once in a DIN 4 cup. By diluting with a mixture of 30 g of xylene, 20 g of n-butanol and 35 g of Solvesso® 150 and 5 g of ethoxy-propyl acetate the batch is adjusted to the spray viscosity corresponding to an efflux time of 21 seconds.

The solids content of the aforementioned clear coating is 43.5% by weight. This represents a distinct improvement over the prior art solids content of only 40% by weight. Further tests on the clear coating have shown that it has improved performance characteristics. Applied to test panels and, after drying, baked at 130° C. for 30 minutes, the clear coating resulted in a pendulum hardness of 12 seconds.

The description, the examples, the coatings and the experimentally determined data all show that the above-stated objects of the invention are indeed achieved.

The preparation of the copolymer solutions and of the coatings involved the use of commercial products which will now be more particularly described:

Shellsol® A starts to boil at 166° C. and has an aromatics content of 98% by volume.

Tinuvin® 1130 is a liquid UV absorber based on a hydroxyphenylbenzotriazole derivative. It is the reaction product of the following 2 components and has an average molecular weight of $M_W > 600$:

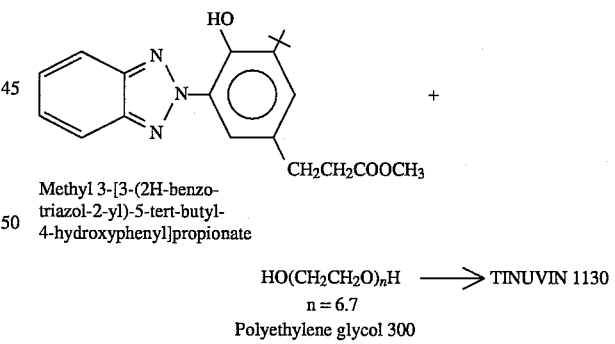

Methyl 3-[3-(2H-benzo-triazol-2-yl)-5-tert-butyl-4-hydroxyphenyl]propionate $HO(CH_2CH_2O)_nH \longrightarrow$ TINUVIN 1130
n = 6.7
Polyethylene glycol 300

Tinuvin® 292 is a liquid light stabilizer, developed for the light stabilization of industrial coatings. Tinuvin® 292 is a member of the class of the sterically hindered amines (HALS). It has the advantage of not being sensitive to acid-catalyzed systems which are used as automotive refinishes with low baking temperatures.

BYK®-300 is an additive for increasing the scratch and mar resistance and it is based on a 50% strength solution of a specific, coating-compatible polysiloxane copolymer. It is manufactured by Byk-Chemie GmbH, D-4230 Wesel, Germany.

BYK®-344 is an additive for increasing the scratch and mar resistance, and it is a 50% strength solution of a specific, modified, coating-compatible siloxane copolymer.

| | |
|---|---|
| Density at 20° C. (DIN 51757) | 0.93–0.95 g/cm³ |
| Refractive index (DIN 53491) | 1.463–1.468 |
| Nonvolatiles (ASTM D1644B) | 48–50% |
| Solvent | 4:1 xylene/isobutanol |
| Flashpoint (DIN/ISO 3679) | 23° C. |
| Appearance | clear or slightly cloudy liquid |

Manufacturer: BYK-Chemie GmbH

BYKETOL®-OK is a flow control additive based on a mixture of high boiling aromatics, ketones and esters.

| | |
|---|---|
| Density at 20° C. (DIN 51757) | 0.86–0.87 g/cm³ |
| Refractive index (DIN 53491) | 1.468–1.474 |
| Flashpoint (DIN/ISO 3679) | 42° C. |
| Appearance | clear or slightly cloudy liquid |

Manufacturer: BYK-Chemie GmbH

Silicone Intermediate SY 231 is a solvent-free, reactive, methoxy-functional polysiloxane having a narrow molecular weight distribution, a low average molecular weight and a very low volatiles content. Silicone Intermediate SY 231 is a clear, slightly yellowish liquid having an alkoxy equivalent of 222, a total silicone content (all methoxy groups replaced by Si—O—Si bonds) of 89% by weight, a viscosity at 25° C. of 100–150 mm²/s, a density of 25° C. of 1.14 g/ml, a refractive index at 25° C. of 1.500–1.505, and a volatiles content (5 g/l h/150° C.) of 2% by weight. Manufacturer: Wacker-Chemie GmbH, 8000 Munich 22, Germany.

BE 683 A is an n-butylated melamine resin having a relatively high solids content of 75%±2, dissolved in n-butanol. Its acid number (mg of KOH/g) is 0.1 max. The viscosity (poise at 25° C.) is between 30 and 60. The white spirit tolerance (ml/5 g) is between 28 and 60. Its viscosity allows transport in tank vessels. It has a wide compatibility range, a high reactivity and good flow properties. Manufacturer: BIP Chemicals Ltd. Popes Lane Oldbury, Warley West Midlands B69 4PD, Great Britain Further variations and modifications of the foregoing will be apparent to those skilled in the art and such variations and modifications are attended to be encompassed by the claims that are appended hereto.

German Priority Application P 41 24 167.3, filed Jul. 20, 1991, is relied on incorporated by reference. U.S. patent application Ser. No. 07/642,962, filed on Jan. 18, 1991, now U.S. Pat. No. 5,153,257, is relied on and is incorporated by reference in its entirety.

What is claimed:

1. A process for preparing a hydroxyl-containing copolymer solution containing inert organic solvents and copolymers based on addition products of α, β-unsaturated carboxylic acid with glycidyl esters and copolymerisable α, β-unsaturated monomers with or without hydroxyl groups, wherein said copolymer solution comprises the components:
   A) 15 to 50% by weight of inert organic solvents,
   B) 50 to 85% by weight of hydroxyl-containing copolymers, wherein said hydroxyl-containing copolymers are obtained by means of simultaneous addition, condensation and polymerization in inert organic solvents or mixtures thereof which exhibit a boiling range between 160° C. and 200° C., and by heating under reflux in the presence of polymerization initiators, optionally chain transfer agents, optionally carboxy-epoxy catalysts, of
      a) 10 to 30% by weight of glycidyl esters of α-alkylalkanemonocarboxylic acids and/or α,α-dialkylalkanemonocarboxylic acids,
      b) 5 to 12% by weight of methacrylic acid,
      c) 10 to 27% by weight of hydroxyalkyl methacrylate having 1 to 6 carbon atoms in the hydroxyalkyl radical,
      d) 10 to 38% by weight of styrene,
      e) 1 to 5% by weight of polypropylene glycol monomethacrylate having an average molecular weight of 350 to 387,
      f) 3 to 20% by weight of alkyl methacrylate having 1 to 8 carbon atoms in the alkyl radical,
      g) 9 to 20% by weight of solvent-free, reactive, methoxy-functional polysiloxane, the percentages of components a, b, c, d, e, f and g always adding up to 100% by weight,
said method comprising heating said inert solvent and said glycidyl ester of α-alkylalkane monocarboxylic acids and/or α,α-dialkylalkane monocarboxylic acids as initial charge into which the necessary monomers a, b, c, d, e, f and component g, polymerization initiators, optionally chain transfer agents, optionally carboxy-epoxy catalysts are subsequently gradually introduced over a period of 12 to 20 hours; and subsequently maintaining the temperature from 140° to 195° C. for 2 to 5 hours, with or without the addition of further polymerization initiator, to thereby form said copolymer solution.

2. The process according to claim 1, wherein component A has a boiling range between 180° C. and 200° C. and is kept as initial charge at the reflux temperature and the metered addition is effected at a uniform rate over 12 to 20 hours and on completion of the metered addition the batch is maintained at the reflux temperature until the copolymerization has ended, although the reflux temperature may drop to about 140° C.

3. The process according to claim 1, wherein component A is used in an amount of 15 to 25% by weight.

4. The process according to claim 3, wherein component A is used in an amount of 15 to 20% by weight.

5. The process according to claim 1, wherein said carboxy-epoxy catalyst is at least one alkali metal compound and is present at 0.001% by weight to 0.5% by weight based on the weight of the ester-forming components.

* * * * *

UNITED STATES PATENT AND TRADEMARK OFFICE
CERTIFICATE OF CORRECTION

PATENT NO. : 5,476,898
DATED : December 19, 1995
INVENTOR(S) : Antonio M. dos Santos It is certified that error appears in the above-indentified patent and that said Letters Patent is hereby corrected as shown below:

On the title page: Item

[60] Please delete ", which is a continuation-in-part of Ser. No. 642,962, Jan. 18, 1991, Pat. No. 5,153,257"

Signed and Sealed this

Seventeenth Day of June, 1997

Attest:

BRUCE LEHMAN

Attesting Officer

Commissioner of Patents and Trademarks